United States Patent [19]

MacDonald

[11] 3,848,234

[45] Nov. 12, 1974

[54] MULTI-PROCESSOR SYSTEM WITH MULTIPLE CACHE MEMORIES

[75] Inventor: Thomas Richard MacDonald, Shoreview, Minn.

[73] Assignee: Sperry Rand Corporation, New York, N.Y.

[22] Filed: Apr. 4, 1973

[21] Appl. No.: 347,970

[52] U.S. Cl. .............................................. 340/172.5

[51] Int. Cl...... G06f 7/28, G06f 13/08, G05b 13/02

[58] Field of Search .................................. 340/172.5

[56] References Cited

UNITED STATES PATENTS

| | | | |
|---|---|---|---|
| 3,339,183 | 8/1967 | Bock | 340/172.5 |
| 3,387,283 | 6/1968 | Snedaker | 340/172.5 |
| 3,525,081 | 8/1970 | Flemming et al. | 340/172.5 |
| 3,569,938 | 3/1971 | Eden et al. | 340/172.5 |
| 3,585,605 | 6/1971 | Gardner et al. | 340/172.5 |
| 3,588,829 | 6/1971 | Boland et al. | 340/172.5 |
| 3,588,839 | 6/1971 | Belady et al. | 340/172.5 |
| 3,693,165 | 9/1972 | Reiley et al. | 340/172.5 |
| 3,699,533 | 10/1972 | Hunter | 340/172.5 |

*Primary Examiner*—Paul J. Henon
*Assistant Examiner*—Jan E. Rhoads
*Attorney, Agent, or Firm*—Thomas J. Nikolai; Kenneth T. Grace; John P. Dority

[57] ABSTRACT

A digital data multi-processing system having a main memory operating at a first rate, a plurality of individual processors, each having its own associated cache memory operating at a second rate substantially faster than the first rate for increasing the throughput of the system. In order to control the access of the main memory by one of the plural processors to obtain information which may not be present in its associated cache memory, a Content Addressable Cache Management Table (CACMT) is provided.

14 Claims, 16 Drawing Figures

L = LENGTH OF CACMT STORE ( NO. OF CACHES x NO. OF BLOCKS/CACHE )

$P_0, P_1 \cdots P_n$ = PROCESSOR IDENTIFYING BITS $I/O_0, I/O_1 \cdots I/O_n$ = INPUT/OUTPUT CONTROLLERS IDENTIFYING BITS

V = VALIDITY BIT

R = REQUESTED BIT

C = CHANGED BIT

* THE "INVALIDATE" BLOCK REQUEST SIGNAL IS SENT TO THE APPROPRIATE CACHE CONTROL ALONG WITH THE ADDRESS OF THE BLOCK TO BE INVALIDATED. THE VALIDITY BIT IS CLEARED IN THE CACHE FOR THIS ENTRY.

MULTI-PROCESSOR SYSTEM WITH MULTIPLE CACHE MEMORIES

BACKGROUND OF THE INVENTION

This invention relates generally to digital computing apparatus and more specifically to a multi-processor system in which each processor in the system has its own associated high speecd cache memory as well as a common or shared main memory.

Computing system designers in the past have recognized the advantages of employing a fast cycle time buffer memory (hereinafter termed a cache memory) intermediate to the longer cycle time main memory and the processing unit. The purpose of the cache is to effect a more compatible match between the relatively slow operating main memory and the high computational rates of the processor unit. For example, in consecutive articles in the IBM *Systems Journal*, Vol. 7, No. 1 (1968), C. J. Conti et al. and J. S. Liptay describe the application of the cache memory concept to the IBM System/360 Model 85 computer. Another publication relating to the use of a cache memory in a computing system is a paper entitled "How a Cache Memory Enhances a Computer's Performance" by R. M. Meade, which appeared in the Jan. 17, 1972 issue of *Electronics*. Also reference is made to the Hunter U.S. Pat. No. 3,699,533 which describes an arrangement wherein the likelihood that a word being sought by a processor will be present in the cache memory is increased.

Each of these articles and the Hunter patent relate principally to the implementation of a cache memory into a unit processor system. While the *Electronics* article suggests the desirability of utilizing the cache memory concept in a multi-processor system, no implementation or teaching is provided of a way of constructing this desired configuration.

In a conventional multi-processor system, plural processor modules and Input/Output (I/O) modules are arranged to communicate with a common main memory by way of suitable priority and switching circuits. While others may have recognized the desirability of incorporating the cache memory concept in a multiprocessor system to thereby increase the throughput thereof, to date only two approaches have been suggested. In the first approach, a single cache memory is shared between two or more processors. This technique is not altogether satisfactory because the number of processors which can be employed is severely limited (usually to two) and cabling and logic delays are introduced between the cache and the processors communicating therewith. These delays may outweigh the speed-up benefits hoped to be achieved.

In the second approach, which is the one described in a Thesis entitled "A Block Transfer Memory Design in a Multi-processing Computer System" submitted by Alan R. Geller in partial fulfillment of the requirements for a Master of Science degree in Electrical Engineering in the Graduate School of Syracuse University in June 1969, each time that a word is to be written into a block stored in the main memory, a search must be conducted in each of said cache memories to determine whether the block is resident therein. If so, the block must be invalidated to insure that any succeeding access results in the new block being transferred into the cache memory unit. Such an approach is wasteful of time.

SUMMARY OF THE INVENTION

The present invention obviates each of these two deficiencies of prior art systems. In accordance with the teachings of the present invention, each of the processors in the multi-processor system has its own cache memory associated therewith and these caches may be located in the same cabinet as the processor with which it communicates, thus allowing for shorter cables and faster access. If it is considered advantageous to the system, the I/O modules can have their own cache memory units. Furthermore, by utilizing a cache memory with each processor module, no priority and switching networks are needed in the processor/cache interface, which is the case with prior art systems in which the processors share a common cache. This too, enhances the throughput of the system of the present invention.

In addition to the utilization of a cache memory for each processor, the system of the present invention employs a content addressable (search) memory and associated control circuits to keep track of the status of the blocks of data stored in each of the several cache memories. This Content Addressable Cache Management Table (hereinafter referred to by the acronym "CACMT") contains an entry for each block of information resident in each of the plural caches. Along with the addresses of each block is stored a series of control bits, which, when translated by the control circuits, allow the requesting unit (be it a processor or an I/O module) to communicate with main memory when it is determined that the word being sought for reading or writing by the requesting processor is not available in its associated cache memory.

When one of the requestors in the multi-processor system requests information, its associated cache memory is first referenced. If the block containing the desired word is present in the cache, the data word is ready out and sent to the processor immediately. If the desired block was not present in the cache of the requesting processor, the CACMT is interrogated to determine if this desired block is resident in another processor's cache. If this block is present in the cache of a different processor and certain predetermined control conditions are met, the requesting processor sends a "request" control signal to the main memory and accesses the desired block therefrom. In the meantime, space is set aside in the cache associated with the requesting processor and a particular bit in the control word contained in the CACMT is set to indicate that the cache memory of the requesting processor is waiting for the desired block. Where the original search of the CACMT indicates that the block being requested for reading or writing is not contained in the cache memory of any other processor in the system, the request is sent to the main memory for the desired block, space is made available for this block in the cache memory of the requesting processor with the block address being written into the search field of the cache unit. An entry is also made in the CACMT which places the address of the block in the search field for this table and then sets the Request bit which indicates that data has been requested, but has not yet arrived from storage.

Most systems that allow multi-programming and/or multi-processing use "Test & Set" type instructions to determine whether access to various data sets shall be permitted. Typically, these instructions either examine, set or clear certain flag bits in a control word to determine access rights to that data. In the present invention, the operation of the CACMT in notifying one processor/cache combination to invalidate a block of data that has been changed by a different processor or in notifying a processor/cache combination to store back its changed data when a different processor has requested this same block of information, is ideally suited to handling the "Test & Set" type instructions.

By incorporating a cache memory with each of the processors in a multi-processor system and by providing a means for monitoring and indicating the presence or absence of a desired word or block of information in one or more of these plural cache memories, it is possible to decrease the effective cycle time of the main memory (normally 1–2 microseconds) to somewhere in the range of 80–200 nanoseconds ($10^{-9}$ seconds), depending upon the parameters of the cache memories and other system trade-offs.

Accordingly, it is the principal object of the present invention to provide a novel memory architecture for a digital computing system of the multi-processor type.

Another object of the invention is to provide a multi-processor system in which cache memories are utilized to increase the throughput of the system.

Still another object of the invention is to provide a unique control and monitoring structure for a multi-processor system which allows a cache memory to be associated with each processor in the system, rather than requiring that each processor share a common cache memory as in prior art arrangements.

Yet still another object of the invention is to provide a content addressable memory and associated control circuits for storing control words comprised of address bits and control bits for each block of data stored in one or more cache memories, allowing a rapid determination as to whether a given block of information desired by one of the processors is present in the cache memory of a different processor in the system.

A still further object of the invention is to provide in a multi-processor system where each processor in the system has associated therewith its own cache memory, a CACMT that maintains a status record of blocks of data which enter and leave the several cache buffers.

For a better understanding of the present invention, together with other and further objects thereof, reference is made to the following description taken in connection with the accompanying drawings and its scope will be pointed out in the appended claims.

DETAILED DESCRIPTION OF THE PREFERRED EMBODIMENT

Figure 1:
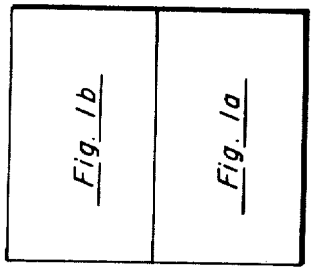
FIGS. 1*a* and 1*b* when oriented as shown in FIG. 1 show a block diagram illustrating the construction of a data processing system incorporating the present invention.
Figure 1B:
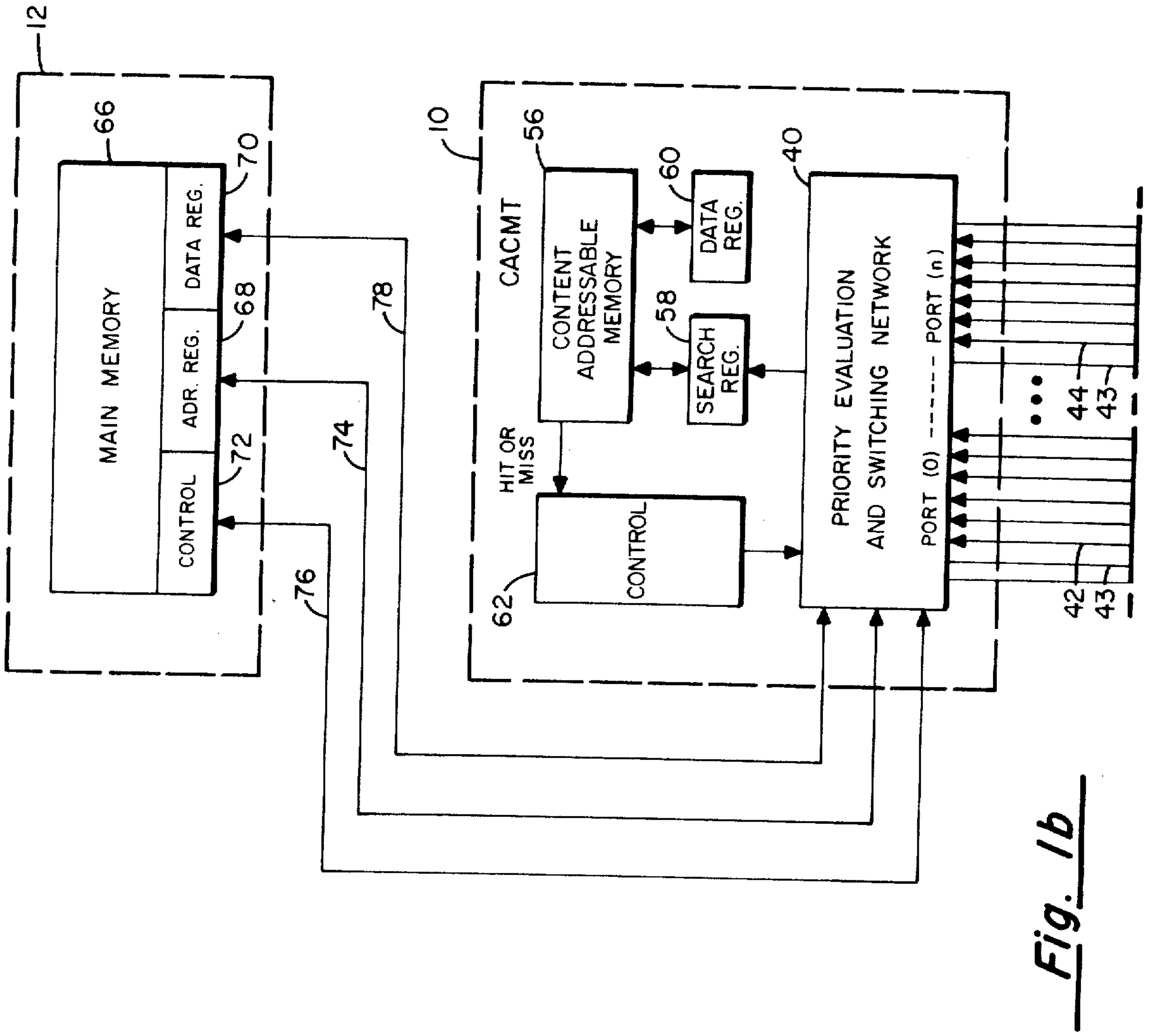
Figure 1A:
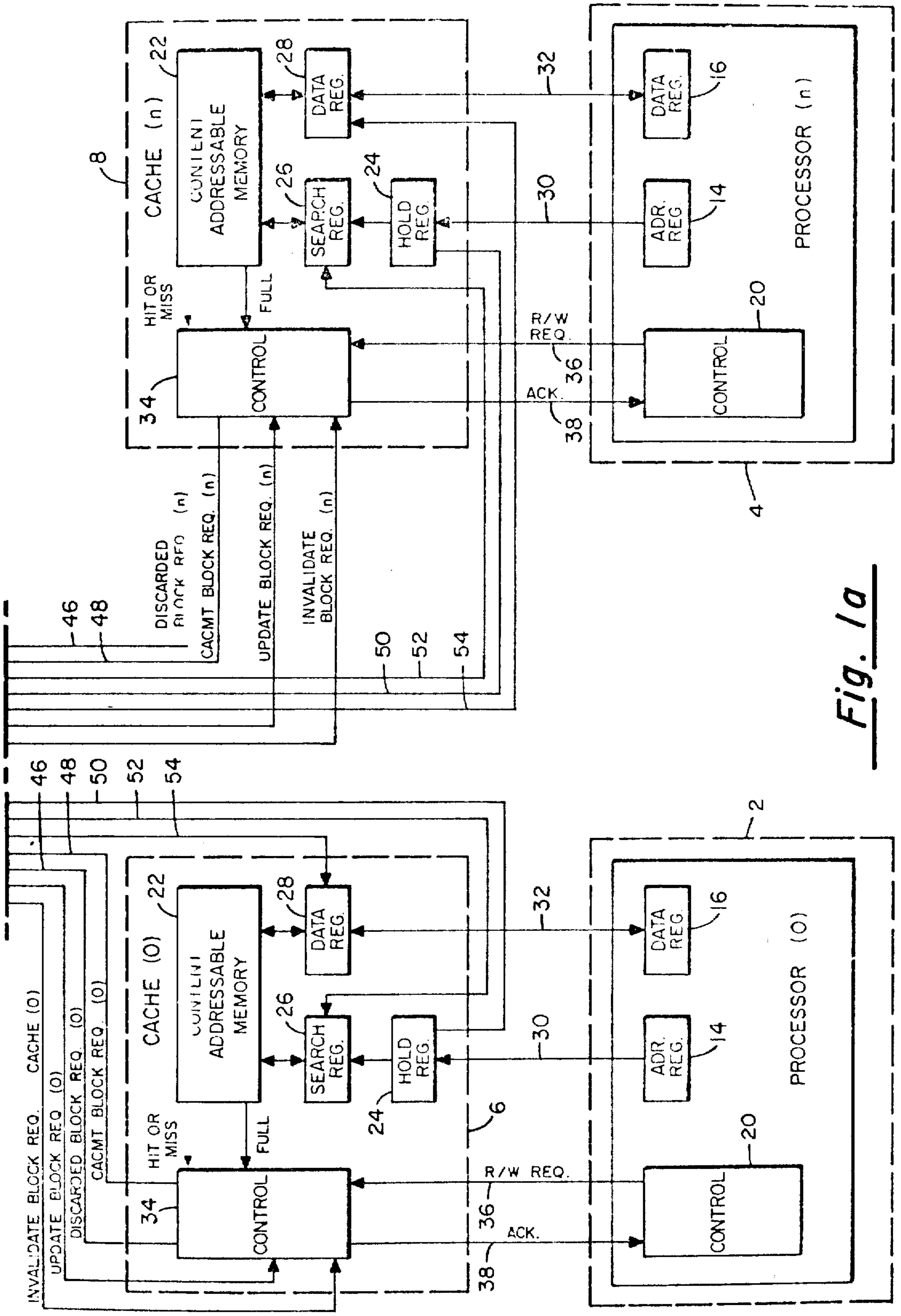
Figure 2A:
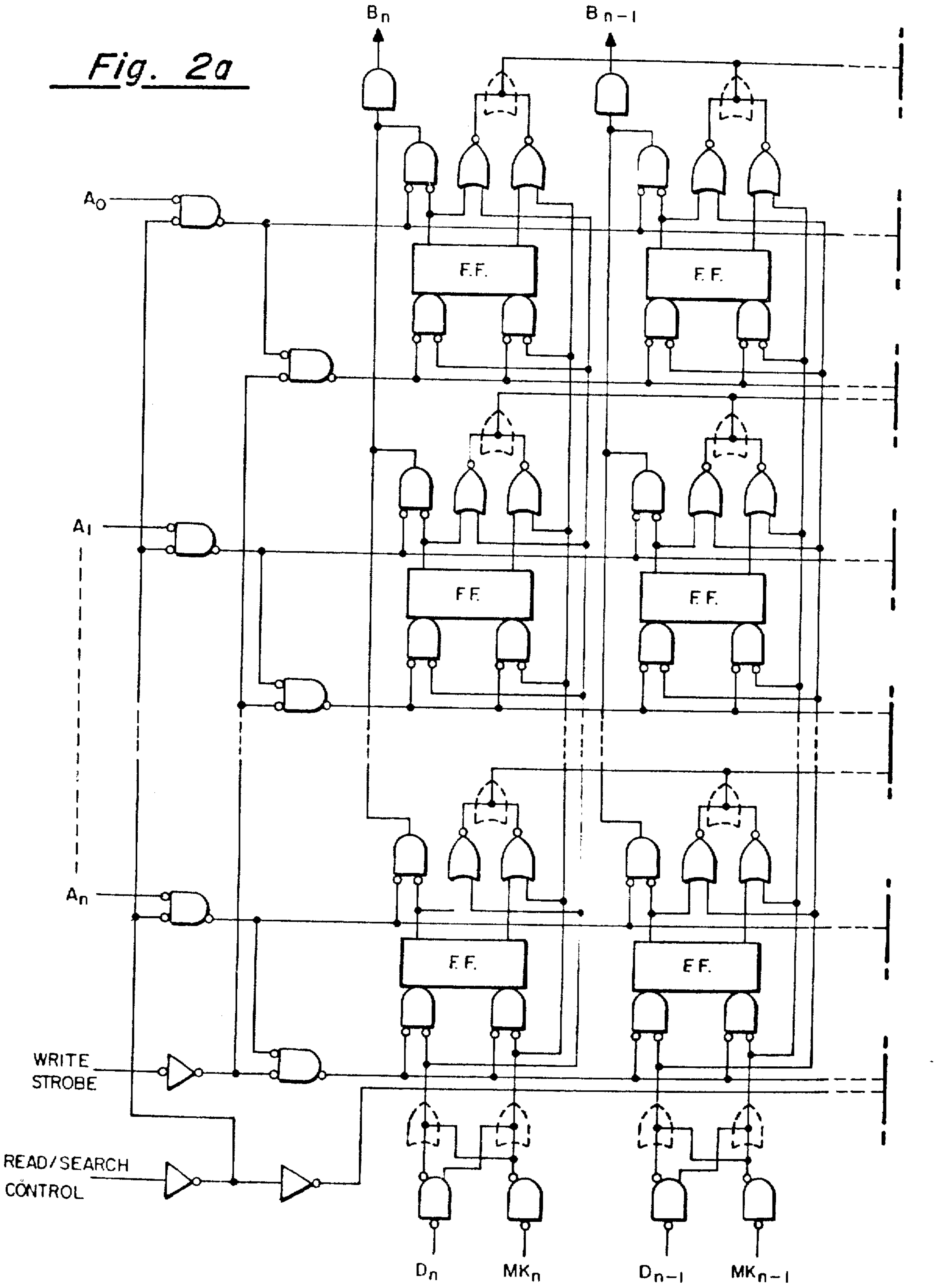
Figure 2B:
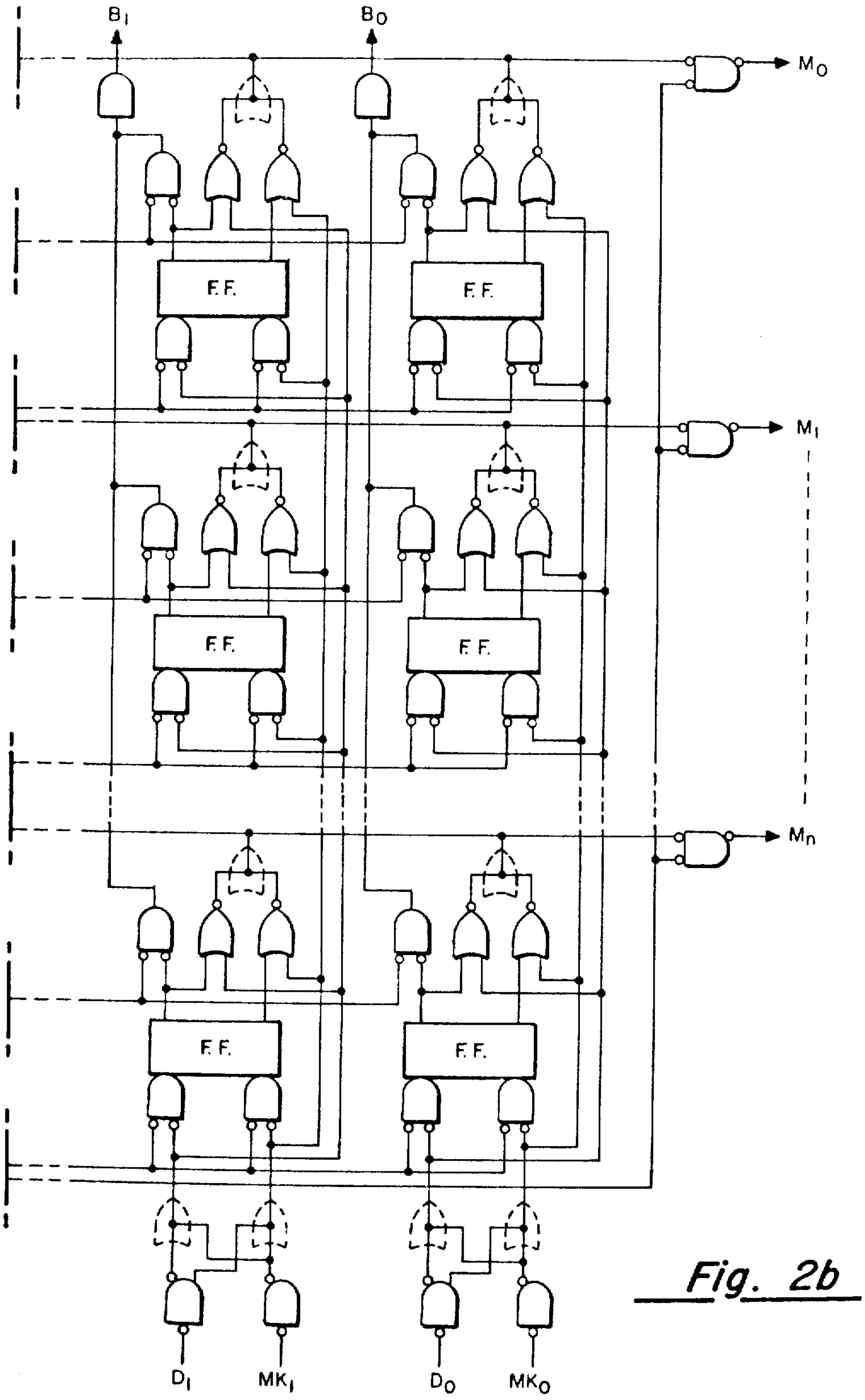

Referring first to FIG. 1*a* and 1*b*, the details of the organization of the system in which the present invention finds use will be presented.

In its simplest form, the system comprises a plurality of separate processors shown enclosed by dashed line rectangles 2 and 4, a corresponding plurality of cache memories shown enclosed by rectangles 6 and 8, a Content Addressable Cache Management Tabel (CACMT) shown enclosed by rectangle 10, and a main memory section shown enclosed by dashed line rectangle 12. For the purpose of clarity, only two processor modules, 2 and 4, are illustrated in the drawing of FIG. 1. However, it is to be understood that the system incorporating the invention is not limited to a two-processor configuration, but instead may have several additional processors connected to other ports of the CACMT 10. A multi-processor system usually also includes plural controllers for effecting input/output operations between the peripheral devices (such as magnetic tape units, magnetic drums, keyboards, etc.) and the system's main memory. While the logic diagram of FIG. 1 does not illustrate such controllers specifically, they would be connected to other ports of the CACMT 10 so as to be able to communicate with the main memory in the same manner as a processor, all as will be more fully explained hereinbelow. Further, such controller units may also have cache memory units associated therewith if this proves to be beneficial to system cost/performance goals. While, for purposes of explanation, FIG. 1 shows only one processor port to its associated cache, it should not be inferred that only a single port can be connected between the processor and the cache memory for in certain applications it may be desirable to include plural inputs between a processor and its cache memory.

Each of the processors, 2 and 4, contains conventional instruction acquisition and instruction execution circuits (not shown) commonly found in the central processing unit of a multi-processor system. Because the present invention relates principally to the manner in which information is transferred between the processor and its associated cache or between the processor cache and main memory, it was deemed unnecessary to explain in detail, features of the processor's instruction execution units.

Each of the processors 2 and 4 includes an address register 14, a data register 16 and a control unit 20. The control unit 20 contains those logic circuits which permit the instruction word undergoing processing to be decoded and for producing "command enable" signals for effecting control functions in other portions of the system. The address register 14 contains a number of bistable flip-flop stages and is capable of temporarily storing signals, which when translated, specify the address in the associated cache memory of a word to be accessed for the purpose of reading or writing. The actual data which is to be written in or obtained from the cache memory passes through the data register 16.

Each of the cache memories 6 or 8 associated with its respective processor 2 or 4 is substantially identical in construction and includes a storage portion 22 which is preferably a block organized content addressable (search) memory, many forms of which are well known in the art. In a block organized memory, each block consists of a number of addressable quantities or bytes (which may be either instructions or operands) combined and managed as a single entity. The address of a block may be the address of the first byte within the block.

Referring to the cache memories 6 and 8, in addition to the Content Addressable Memory (CAM) 22 is a hold register 24, a search register 26 and a data register 28. The hold register 24 is connected to the address register 14 contained in the processor by means of a cable 30 which permits the parallel transfer of a multi-bit address from the register 14 to the register 24 when gates (not shown) connected therebetween are enabled by a control signal. Similarly, the data register 28 of the cache memory section is connected to the data register 16 of its associated processor by a cable 32 which permits a parallel transfer of a multi-bit operand or instruction between these two interconnected units.

Each of the cache memories 6 and 8 also includes a control section 34 which contains the circuits for producing the "read" and "write" currents for effecting a readout of data from the storage section 22 or the entry of a new word therein. Further, the control section 34 includes the match detector logic so that the presence or absence of a word being sought in the storage section 22 can be indicated.

In addition to the "hit" or "miss" detector logic, the control section 34 of the cache memories also contains circuits which determine whether the storage section 22 thereof is completely filled. Typically, the capacity of the storage unit 22 is a design parameter. As new blocks of information are entered therein, a counter circuit is toggled. When a predetermined count is reached, the overflow from the counter serves as an indication that no additional entries may be made in the CAM 22 unless previously stored information is flushed therefrom.

A control line 36 connects the control section 20 of the processor to the control section 34 of its associated cache memory. It is over this line that "read" and "write" requests are transmitted from the processor to the associated cache. A second control line 38 connects the control network 34 of the cache memory to the control network 20 of its associated processor and is used for transmitting the "acknowledge" signal which informs the processor that the request given by the processor has been carried out. A more complete explanation of the Request/Acknowledge type of communication between interconnected digital computing units can be obtained by reference to the Ehrman et al. U.S. Pat. No. 3,243,781 which is assigned to the assignee of the present invention.

Figure 2:
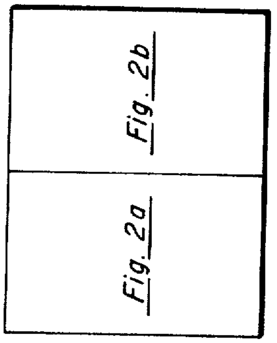
FIG. 2 is a logic diagram of a CAM-WAM integrated circuit chip for implementing a cache memory unit.

Before proceeding with the explanation of the system, it is considered desirable to consider the preferred makeup of the cache memory units suitable for use in the system of FIG. 1. FIG. 2 represents the logic circuitry for implementing much of the control portion 34 and the CAM portion 22 of the cache memory unit 6 and/or 8. In the preferred embodiment, the structure may comprise a plurality of emitter coupled logic (ECL) Content Addressable Memory (CAM) integrated circuits. These monolithic chip devices have data output lines $B_0, B_1, \ldots B_n$ provided so that they may be used as Word Addressable Memory (WAM) devices as well, keeping in mind, however, that a word readout and a parallel search function cannot take place simultaneously. Because of the dual capabilities of these integrated circuit chips, they are commonly referred to as "CAM-WAM" chips.

The input terminals $D_0, D_1, \ldots D_n$ at the bottom of the figure are adapted to receive either input data bits to be stored in the CAM-WAM on a write operation or the contents of the search register 26 during a search operation. Located immediately to the right of the Data (D) terminals for each bit position in a word is a terminal marked MK, i.e., $MK_0, \ldots MK_n$. It is to these terminals that a so-called "mask word" can be applied such that only predetermined ones of the search register bits will comprise the search criteria.

For exemplary purposes only, FIG. 2 illustrates a 32-bit memory (8 words each 4-bits in length). However, in an actual working system additional word registers of greater length would be used. Each word register includes four Set-Clear type bistable flip-flops, here represented by the rectangles legended FF. Connected to the input and output terminals of these flip-flops are logic gates interconnected to perform predetermined logic functions such as setting or clearing the flip-flop stage or indicating a match between the bit stored in a flip-flop and a bit of the search word stored in the search register. The symbol convention used in the logic diagram of FIG. 2 conforms to those set forth in MIL-STD 806D dated Feb. 26, 1962 and entitled "Militiary Standard — Graphic Symbols for Logic Diagrams" and it is felt to be unnecessary to set forth herein a detailed explanation of the construction and mode of operation of the CAM-WAM chip, since one of ordinary skill in the art having the FIG. 2 drawing and the aforementioned "Standard" before him should be readily able to comprehend these matters.

Located along the left margin of FIG. 2 are a plurality of input terminals labeled $A_0, A_1, \ldots A_n$. These are the so-called "word select" lines which are used to address or select a particular word register during a memory readout operation or during a write operation. During a read operation, a particular word select line $A_0 \ldots A_n$ of the WAM is energized when a "Read" control pulse is applied to the "Read/Search" terminal, and the address applied to terminals $D_0, \ldots D_n$ of the CAM matches a block address stored in the CAM. Selected gates in the array are enabled to cause the word stored in the selected word flip-flops to appear at the output terminals $B_0 \ldots B_n$. Terminals $B_0 \ldots B_n$ connect into the data register 28 in FIG. 1.

When entering a new word into the CAM-WAM memory array, the data word to be written at a particular address or at several addresses is applied from the data register 28 (FIG. 1) to the terminals $D_0 \ldots D_n$ of the WAM and a word select signal is applied to one of the terminals $A_0 \ldots A_n$ by means of a CAM address match with the CAM inputs $D_0 \ldots D_n$. Now, when the "Write Strobe" control signal is applied at the indicated terminal, the selected memory word registers will be toggled so as to contain the bit pattern applied to the terminals $D_0 \ldots D_n$ unless a mask word is simultaneously applied to the terminals $MK_0 \ldots MK_n$. In this latter event, the bit(s) being masked will remain in its prior state and will not be toggled.

In a search operation, the contents of the search register 26 (the search criteria) are applied to terminals $D_0 \ldots D_n$ and a mask word may or may not be applied to terminals $MK_0 \ldots MK_n$. When a "Search" control signal is applied to the indicated terminal, the contents of each memory register will be simultaneously compared with the search criteria (either masked or unmasked) and signals will appear on the terminals $M_0 \ldots M_n$ indicating equality or inequality between the unmasked bits of the search register and the several word register in the memory.

Figure 3:
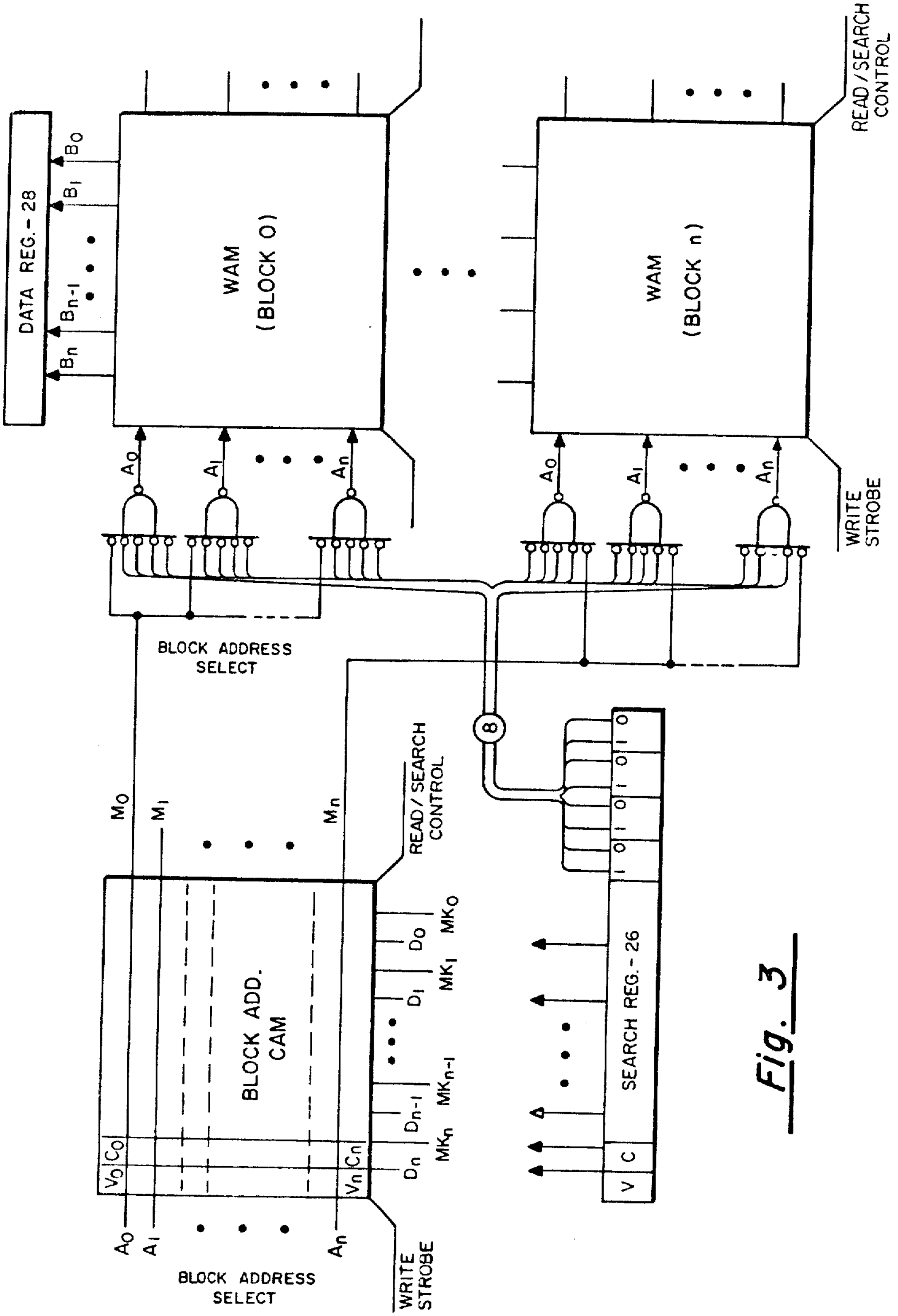
FIG. 3 illustrates the manner in which plural CAM-WAM chips of FIG. 2 can be interconnected to implement the cache memory unit.

FIG. 3 illustrates the manner in which several CAM-WAM chips of the type shown in FIG. 2 can be interconnected to implement the cache memory CAM 22 and control 34. The block address CAM chip is arranged to store the addresses of blocks of data words stored in the several word CAM. Since each block may typically contain 16 individual data words additional but similar chips are required to obtain the desired capacity in terms of words and bits per word, it being understood that FIGS. 2 and 3 are only intended for illustrative purposes.

Connected between each match terminal $M_0 \ldots M_n$ of the block address chip of FIG. 3 and corresponding word select terminals $A_0 \ldots A_n$ of the word CAMs are a plurality of coincidence gates, there being one such gate for each word in a block. The output on a given block address match terminal serves as an enable signal for each word gate associated with that block and the remaining set of inputs to these word gates come from predetermined stages of the search register 26 (FIG. 1) and constitutes a one out of 16 translation or decoding of these four word address bits.

Using the system of FIG. 3, it is possible to enter a block address into the cache search register 26 and in a parallel fashion, determine whether a block having that address is resident in the cache and then when a "hit" results from such a parallel interrogation, it is possible to uniquely address any one of the data words included in that block and transfer that word into the processor via the data register 28.

Each of the processors 2 and 4 and their associated cache memory units 6 and 8 are connected to the CACMT 10 by way of data cables, address cables and control lines. The principal interface between the CACMT and the associated processors and processor caches is the multi-port priority evaluation and switching network 40. The function of the network 40 is to examine plural requests coming from the several processors and Input/Output controllers employed in the multi-processing system and to select one such unit to the exclusion of the others on the basis of a predetermined prior schedule. Once priority is established between a given processor/cache sub-assembly, the switching network contained in the unit 40 controls the transmission of data and control signals between the selected units and the remaining portions of the CACMT 10.

While the nature of the control signals and data paths between the cache control and the CACMT priority evaluation and switching network 40 will be described more fully hereinbelow, for now it should suffice to mention that a conductor 42 is provided to convey an "Update Block Request" control signal from the CACMT 10 back to the control section 34 of the cache 6 associated wih Port (O) of the priority and switching network 40 and a corresponding line 44 performs this function between Port (n) and the control circuits 34 of cache (n). The control section 34 of each of the cache memories 6, 8 used in the system are also coupled by way of control lines 43, 46 and 48 to the associated port of the network 40.

The search registers 26 of the various cache memories are connected by a cable 50 to the port of the priority evaluation and switching network 40 corresponding to the processor in question to allow the transfer of address signals from the search registers to switching network 40. Similarly, the search register 26 of the cache memory is coupled by a cable 52 to a designated port of network 40. Finally, a cable 54 is provided to permit the exchange of data between the switching network 40 and the data register 28 of the particular processor selected by the priority evaluation circuits of network 40.

In addition to the priority evaluation and switching network 40, the CACMT 10 includes a word oriented content addressable memory 56 along with an associated search register 58 and data register 60. As was explained in connection with the CAM's employed in the various caches 6, 8, etc., CAM 56 also has associated therewith a control section 62 which includes match logic detection circuitry as well as other logic circuits needed for controlling the entry and readout of data from the memory 56.

Figure 4:
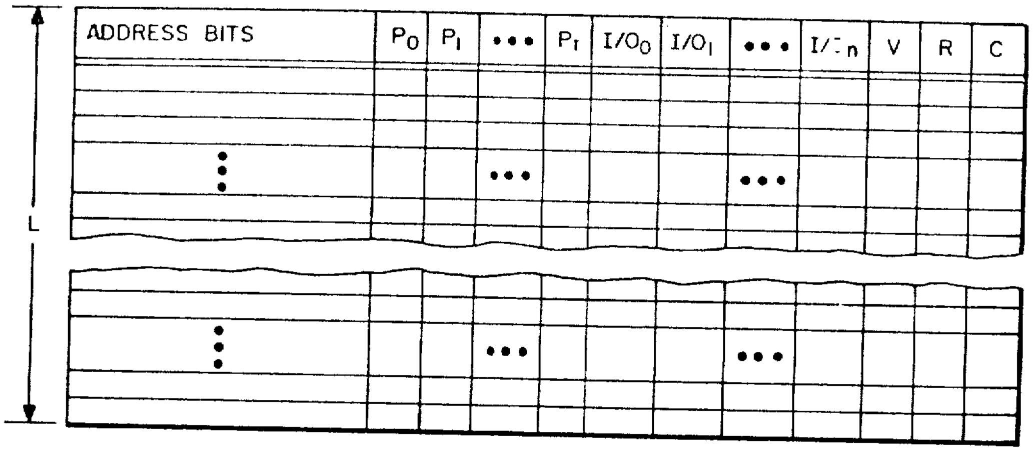
FIG. 4 illustrates diagrammatically the make-up of the control words maintained in the CACMT.

FIG. 4 illustrates the format of the status control words stored in the CAM 56. The CAM 56 has a length (L) sufficient to store a status control word for each block of data which can be accommodated by the cache memories utilized in the system as indicated in the legend accompanying FIG. 4. Each of the status control words includes a number of address bits sufficient to uniquely refer to any one of the plural blocks of data stored in the main memory 12. In addition to these address bits are a number of processor identifying bits $P_0$ through $P_n$ equal to the number of independent processors employed in the system. In a similar fashion, each of the I/O controllers in the system has a corresponding identifier bit (labeled $I/O_0$ through $I/O_n$) in the status control word stored in CAM 56. The status control words include still further control bits termed the "validity" bit (V), the "requested" bit (R) and the "changed" bit (C), the purposes of which will be set forth below.

Address information and data is transferred between the main memory 12 and the CACMT priority evaluation and switching network 40 by way of cables 74 and 78. The Priority & Switching unit includes amplifiers and timing circuits which make the signals originating within the CACMT and the main memory compatible.

The main memory section 12 of the data processing system of FIG. 1 contains a relatively large main storage section 66 along with the required addressing circuits 68, information transfer circuits 70 and control circuits 72. In the practice of this invention, the main storage section 66 is preferably a block-organized memory wherein information is stored in addressable locations and when a reference is made to one of these locations (usually the first byte in the block) for performing either a "read" or a "write" operation, an entire block consisting of a plurality of bytes or words is accessed. While other forms of storage such as toroidal cores or thin planar ferromagnetic films may be utilized, in the preferred embodiment of the invention the main memory 66 is preferably of the magnetic plated wire type. Such plated wire memories are quite suitable for the present application because of their potential capacity, non-destructive readout properties and relatively low cycle times as compared to memories employing toroidal cores as the storage element. An informative description of the construction and manner of operating such a plated wire memory is set forth in articles entitled "Plated Wire Makes its Move" appearing in the Feb. 15, 1971 issue of *Computer Hardware* and "Plated Wire Memory — Its Evolution for Aerospace Utilization" appearing in the *Honeywell Computer Journal*, Vol. 6, Nov. 1, 1972. The block size, i.e., the number of words or bytes to be used in a block, is somewhat a matter of choice and depends upon other system parameters such as the total number of blocks to be stored collectively in the cache memories 22, the capacity of the CAM 56 in the CACMT 10, the cycle time of the cache memories, and the nature of the "replacement algorithm" employed in keeping the contents of the various caches current.

When accessing main memory, address representing signals (the address tag) are conveyed over the cable 74 from the Priority & Switching unit 40 to the address register 68. With this address tag stored in the register 68, upon receipt of a transfer command over conductor 76, the tag will be translated in the control section 72 of the main memory 12 thereby activating the appropriate current driver circuits for causing a desired block of data to be transferred over the conductor 78 from the data register 70 to the Prior & Switching unit 40. Similarly, when a new block of information is transferred into main memory either from an Input/Output controller (not shown) or from one of the cache memories, the data is again transferred in block form over cable 78. It is to be noted that data exchanged between the main memory 12 and the CACMT 10 is on a block-by-block basis as is the exchange between the CACMT 10 and the cache memories 6 or 8. Exchanges between a processor and its associated cache, however, is on a word basis. A block may typically be comprised of 16 words and each word may be 36 bits in length, although limitation to these values is not to be inferred. Each block within a cache has an address tag corresponding to the main memory block address which is present in that cache block position.

Now that the details of the organization of the system in corporating the present invention has been described in detail, consideration will be given to its mode of operation.

OPERATION — READ MODE

Referring now to FIG. 1 and to the flow diagram of FIGS. **5*a*, 5*b* and 5*c*, consideration will be given to the manner in which a given processor can acquire, i.e., "read," a particular word from its associated cache memory. Let it first be assumed that the program being run by Processor (O) (block 2 in FIG. 1*a*) requires that a word of information be acquired from its associated cache memory 6. Of course, it is to be understood that this type of operation could take place in any of the processors employed in the system and it is only for exemplary purposes that consideration is being given to processor 2 and its associated cache 6.**

Processor 2 first determines in its control mechanism 20 that the instruction being executed requires data from storage. The control network 20 of processor 2 generates a "read" request control signal which is sent to the control unit 34 of the cache memory 6 by way of line 36. The address of the desired word of data is contained in register 14 and is sent to the hold register 24 by way of cable 30. Following its entry into the hold register 24, these address representing signals are also transferred to the search register 26. Once the search criteria is located in the register 26, the cache control 34 causes a simultaneous (parallel) search of each block address stored in the CAM 22 to determine whether the block containing the word being sought is contained in the cache CAM 22 and whether the validity bit associated with the block address is set to its "1" state. The match logic detectors of the CAM 22 will produce either a "hit" or a "miss" signal. If a "hit" is produced indicating that the desired block is available in the cache memory 22., the requested word within this block is gated from the cache WAM (see FIG. 3) to the data register 28. Subsequently, this data is gated back to the data register 16 contained within processor 2 and an "acknowledge" signal is returned from the cache control circuit 34 to the processor control section 20 by way of conductor 38. This "acknowledge" signal is the means employed by the cache memory to advise the processor that the data it sought has been transferred.

Figures 5, 5A:
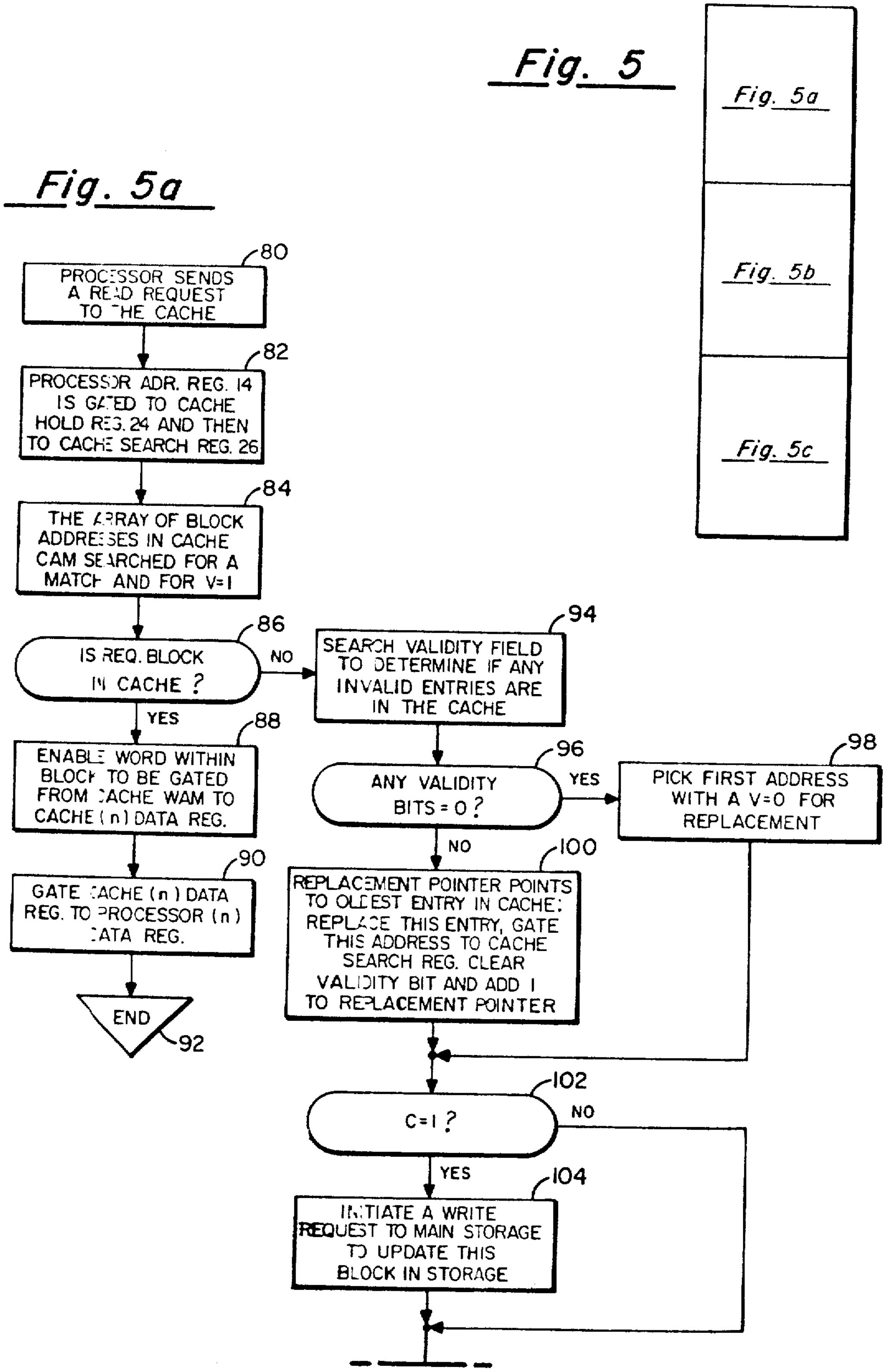
FIG. 5*a*, 5*b* and 5*c* when oriented as shown in FIG. 5 depicts a flow diagram illustrating the sequence of operation when one of the processors in the system of FIG. 1 is in the "read" mode.

The foregoing mode of operation is represented in FIG. **5*a* by the path including the diagram symbols 80 through 92 and involves the assumption that the block containing the requested word was resident in the cache CAM 22 at the time that the "read" request was presented thereto by way of control line 36. Let it now be assumed that the block containing the desired word was not present in the cache memory and that a "miss" signal was produced upon the interrogation of CAM 22. In FIG. 5*a*, this is the path out of decision block 86 bearing the legend "No" which leads to block 94. As is perhaps apparent, when the word being sought is not present in the CAM 22, it must be acquired from the main memory 12. However, there is no direct communication path between the main memory 12 and the processor module 2. Hence, any data transfer from the main memory to the processor must come by way of the processor's associated cache 6. Accordingly, a test is made to determine whether the CAM 22 is full, for if it is, it is necessary to make space available therein to accommodate the block containing the desired word which is to be obtained from the main memory 12. In making this test, the CAM 22 of the cache unit associated with the requesting processor is searched to determine whether any block address register in the Block Address CAM (FIG. 3) has its "validity" bit (V) equal to zero, indicating an invalid entry. This is accomplished by masking out all of the bits in the search register 26 except the endmost bit (the V-bit) and then performing a parallel search of the Block Address CAM. An output on a particular line $M_0 \ldots M_n$ indicates that the V-bit at that block address is "0" and that the block associated with this address is no longer valid and can be replaced. This sequence of operations is represented by symbols 94, 96 and 98 in FIG. 5*a***.

As is further indicated by the flow diagram of FIG. 5*a*, if the test indicates that no V-bit in the Block Address CAM is a "0" a decision must be made as to which block must be removed from the cache CAM-WAM to thereby make room for the new entry.

Several approaches are available for deciding which block of data to discard from the cache memory when it is desired to enter new information into an already filled cache and the term "replacement algorithm" has been applied to the sequency of steps used by the control hardware in the cache unit for finding room for a new entry. In one such arrangement, a first in first out approach is used such that the item that has been in the cache the longest time is the candidate for replacement. In another scheme, the various data blocks in the cache memory may be associated with corresponding blocks in the main memory section by means of entries in an activity list. The list is ordered such that the block most recently referred to by the processor program is at the top of the list. As a result, the entries in the activity list relating to less frequently accessed blocks settle to the bottom of the list. Then, if a desired block is not present in the cache memory and the cache memory is already full of valid entries, the entry for the block that has gone the longest time without being referred to is displaced.

Other replacement algorithms can be envisioned wherein the least frequently referenced block is the one selected for replacement. This is consistent with the philosphy behind a cache memory architecture. A cache memory configuration is advantageous only because real programs executed by computers are not random in their addressing patterns, but instead tend to involve sequential addresses which are only interrupted occasionally by jump instructions which divert the program steps to a series of other sequential addresses.

For convenience, the preferred embodiment envisioned and best mode contemplated for implementing the replacement algorithm is simply to provide in the cache control 34 an *m*-stage binary counter where $2^m$ is equal to or greater than the capacity in blocks of the cache unit. Each time a new block of information is entered into the WAM and its associated block address is written into the CAM (see FIG. 3), the count is advanced so that it can be said that the contents of this *m*-stage counter constitutes a pointer word which always points to or identifies the block in the cache unit to be replaced. Then, when the search of the validity bits fails to indicate an invalid block for replacement, a check is made of the pointer word and the block identified by said pointer word is selected for replacement. Replacement is actually accomplished by gating the address of the block identified by the pointer to the search register 26 and then clearing the V-bit of that block address. The replacement pointer word is updated by adding +1 to the previous count in the *m*-stage counter during the time that the new entry is being loaded into the slot identified by said previous count (see symbol 100 in FIG. 5*a*). Thus, the replacement counter will count through the block address registers such that when an entry is made in the last register location, the counter will be pointing to location zero as the next entry to be replaced.

The next determination which must be made is whether the "changed" bit (C) of the block address for the block to be discarded has been set, thereby indicating that one or more of the information words in this block has been changed from that which is in the corresponding block in the main memory. Referring to FIG. 3, this is accomplished by pulsing the Read/Search control line and the Block Address line $D_0 \ldots D_n$ for this block and sampling the output on the bit line associted with the "C" bit ($C_0 \ldots C_n$). Where it is determined that the "changed" bit for the block had been set in the cache Block Address CAM, the requesting processor immediately issues a "Write" request control signal to main memory for the purpose of updating this block in the main memory. The manner in which this last step is accomplished will be explained more particularly hereinafter when the operation of the system in the write mode is discussed. If it had been determined that the "changed" bit had not been set, this step of initiating a write request would have been bypassed as illustrated by symbols 102 and 104 in FIG. 5*a*.

Figure 5B:
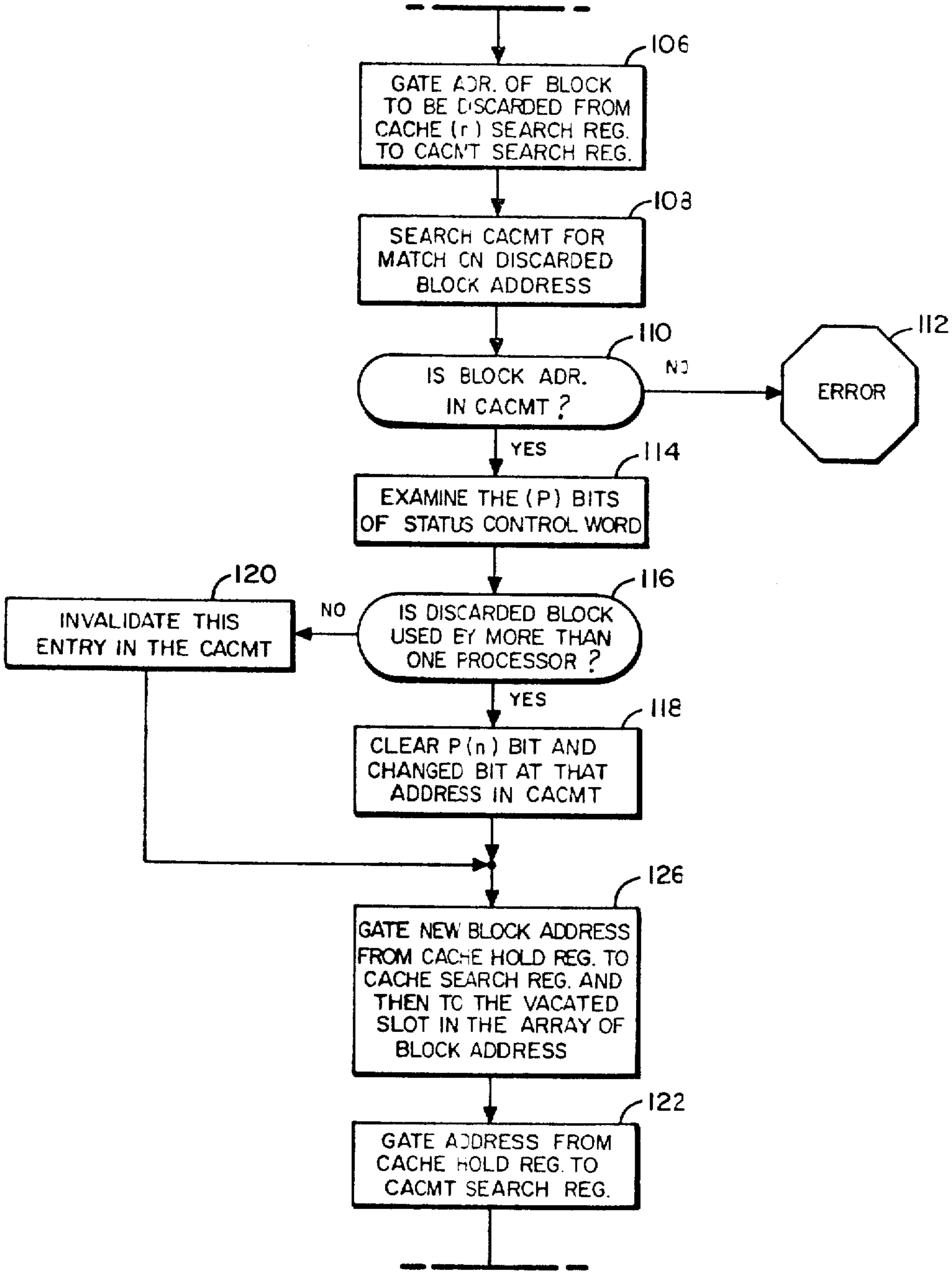

Referring now to the flow diagram of FIG. 5*b*, following the determination of the block to be replaced, the operation set forth by the legend in symbol 106 is next performed. More specifically, the address of the block of data which is to be discarded as established during execution of the replacement algorithm (the address which was held in the search register 26 of cache 6) is gated to the search register 58 of the CACMT 10. The information in search register 58 is then used to interrogate CAM 56 to determine if this block of information to be discarded is contained elsewhere in the system, i.e., in a cache associated with another processor such as Processor (n) or in the main memory 12. This interrogation will again yield either a "hit" or a "miss" control signal. A "miss" control signal results in the generation of an error interrupt since if there is a block in a cache unit, there must necessarily be an entry corresponding to it in the CACMT. In the event of a "hit," the control word (address + designator bits) is gated out of the CAM 56 into the data register 60. The control network 62 examines the processor identifier bits of this control word by means of a translator network to determine if the cache memory associated with more than one processor contains the block which is to be discarded. These operations are signified in the flow diagram of FIG. 5*b* by symbols 108, 110, 112 and 114.

Where the control network 62 does determine that more than one processor contains the block of information to be discarded (symbol 116), the processor's identifying bit (P) and the changed bit (C) in the control word at this address in CAM 56 must be cleared (symbol 118). In way of further explanation, as shown in FIG. 4, there is an identifying bit in the designator field of the control words stored in CAM 56 pertaining to each requestor unit, i.e., $P_{(0)}$ through $P_{(N)}$ or I/O controllers in the system have an identifying bit ($I/O_{(0)}$ through $I/O_{(n)}$) in each control word.

If the test (symbol 116 in FIG. 3*a*) reveals that the block to be discarded is contained only in the cache memory of the requesting processor and in none other, the path through symbol 120 is followed and the status control word entry in the CACMT 10 corresponding to the block selected for replacement is simply eliminated by having its validity bit cleared. Irrespective of the outcome of the inspection of the processor identifying bits of the status control word for the block to be replaced, it is necessary to gate the new block address generated by the requesting processor (which was entered into the cache hold register 24 in step 82 of FIG.

5*a* ) from the cache hold register 26 to the cache search register 26 and from there into the vacated spot in the array of block addresses in the Block Address CAM (FIG. 3). This operation is indicated in FIG. 5*b* by symbol 126. Following this, the contents of the cache search register 24 are gated to the CACMT search register 58 by way of bus 50 which connects to Port (0) of the CACMT 10 (symbol 122 in FIG. 5*b*). Once this address is in the search register 58, the CAM 56 is interrogated in a parallel fashion and a determination is made whether the status control word for the originally requested block of data is contained in the CACMT CAM 56 (symbol 124 in FIG. 5*c*). If this control word had been contained in the CAM 56 a "hit" on that address results in the status control word being sent to the data register 60 and to the control network 62.

Figure 5C:
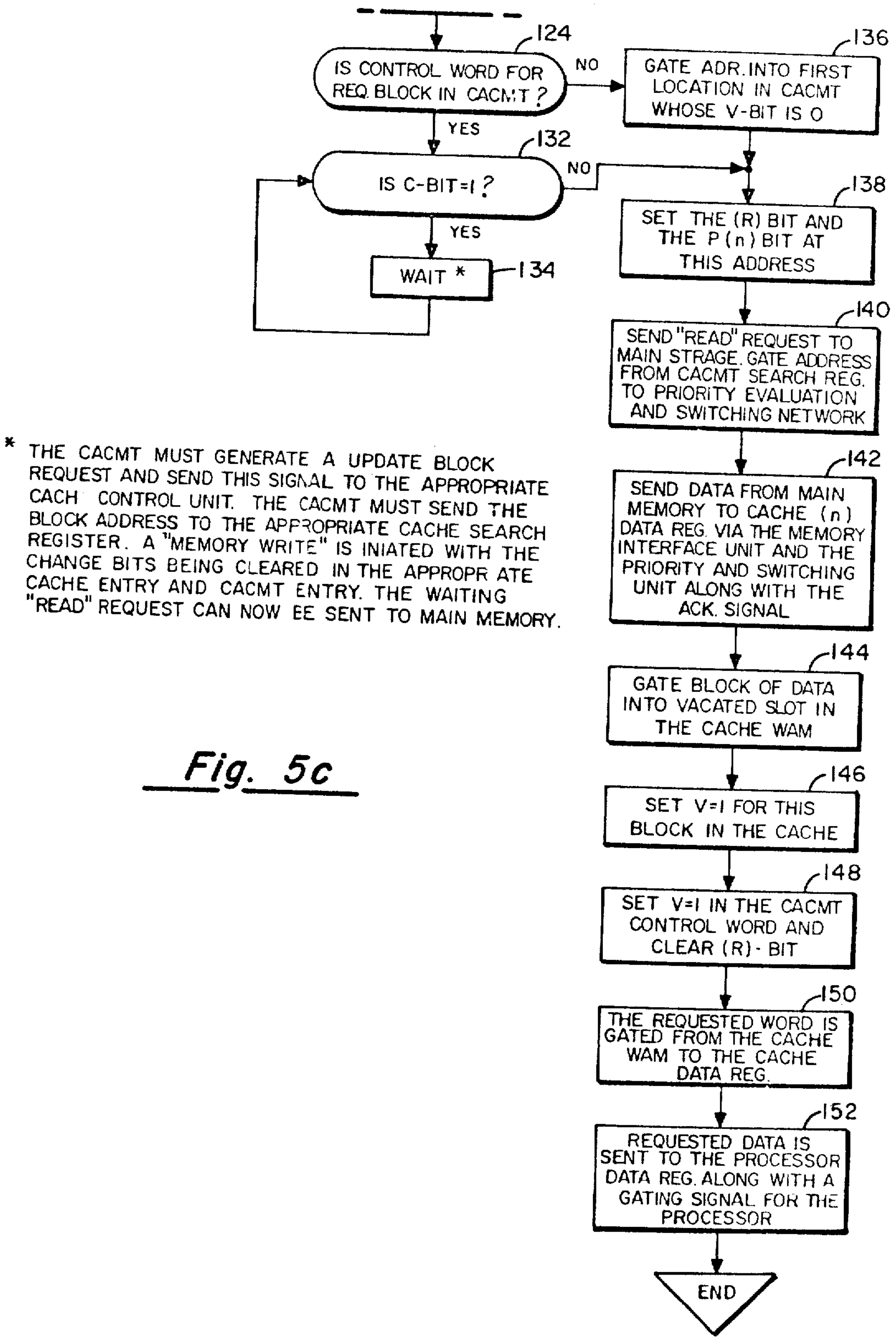

Next, refer to the flow chart of FIG. 5*c*, especially to symbols 132 and 134. Most systems that allow multiprogramming and/or multi-processing use "Test & Set" type instructions to determine whether access to various data sets shall be permitted. Typically, these instructions either examine, set or clear certain flag bits in a control word to determine access rights to that data. In the present invention, the operation of the CACMT in notifying one processor/cache combination to invalidate a block of data that has been changed by a different processor or in notifying a processor/cache combination to store back its changed data when a different processor has requested this same block of information, is ideally suited to handling the "Test & Set" type instructions. The "changed" bit (C) of the status control word (FIG. 4) is examined. When this "changed" bit is set, it indicates to the requesting processor that another processor is currently effecting a change in the information in the block associated with that status control word and a delay is introduced. The requesting processor must wait until the block being sought has been released by the particular processor which has been involved in changing that block. Rather than tying up the entire system in this event, the CACMT 10 signals the processor that had caused this "changed" bit to be set that another processor is requesting access to this same block of information and that the changing processor must immediately store this block back into main memory and clear the "changed" bit so that the second processor can be afforded an opportunity to access the changed information (see blocks 132 and 134 in FIG. 5*c*).

It was previously assumed that the status control word for the requested block was resident in the CACMT so that its "changed" bit could be checked. If the search of the CACMT reveals that the status control word is not present therein, it becomes necessary to form a new status control word therein. This is accomplished by transferring the contents of the CACMT search register 56 into the first location in the CACMT where the validity bit is cleared. It will be recalled that in carrying out either step 118 or 120 of the flow chart, that a validity (V) bit was cleared in at least one of the status control words contained in the CACMT. Thus, it is assured that at least one location will be present in the CACMT where the V-bit is zero. Also, in forming the new status control word in the CACMT preparatory to acquiring a block of information from the main memory, the processor identifying bit for the requesting processor and the "Requested" bit (R) for that block are set as is indicated by symbols 136 and 138 in FIG. 5*c*. The setting of the R-bit in the status control word associated with a block is the means for advising any other processor (requestor) in the system that a first requestor has also made a request and is waiting for the desired block to arrive from the main memory.

Under the original assumption that Processor (0) is the requestor, the setting of the processor identifying bit $P_{(0)}$ at this address in the CACMT indicates that the requesting processor is going to use that block of information. Next, the "read request" control signal is transmitted to the control circuits 72 of main memory 12 by way of control line 76. This request signal is the means employed to signal the main memory that a cache memory unit desires to obtain a block of information which was requested by a processor, but which was not found in its associated cache memory unit. At the same time that the "request" control signal is delivered over conductor 76 to memory control network 72, the block address stored in the search register 26 in the cache memory unit 6 is gated to the priority evaluation and switching network 40, which is part of the CACMT 10 (see symbol 140 in FIG. 5*c*).

With the address of the desired block of information and a memory request presented to the main memory 12, the block of information stored at the specified address is read out from the main memory into the data register 70, and from there, is sent back through the switching network 40, and the cable 54 to the data register 28 of the cache memory associated with the requesting processor. Once this block of new information is available in the data register 28, a command is generated in the control network 34 causing the new block of data to be written into the proper locations in the WAM portion of the cache memory at the address maintained in the search register 26. Thus, the particular block of data containing the desired word requested by the processor is made available to that processor from the main memory by way of the processor's cache memory unit. These steps are indicated in the flow diagram of FIG. 5*c* by operation symbols 142 and 144.

Following the loading of the desired data block into the cache memory unit of the requesting processor, the validity bit (V) for this block is set in the CAM 22 and the "requested" (R) bit (FIG. 4) contained in the control word of the CAM 56 must be cleared, thus indicating that the requested block of information from memory has now been received and is present in the CAM 22. Further, the V-bit in the status control word associated with this new block must be set in the CACMT to thereby indicate to other requestors that the block in question is valid.

As represented by blocks 150 and 152 in FIG. 5*c*, the data from the cache memory 6 is next sent via the data register 28 and cable 32 to the data register 16 of the requesting processor 2 so that the data word may be utilized in carrying out the program undergoing execution in the processor 2.

Referring to FIG. 1, consideration will now be given to the control signals developed on lines 46 and 48.

As described above, when the cache replacement algorithm was invoked to make room for a new entry, the address of the discarded block was gated from the search register 26 of the cache memory 6 to the search register 58 of the CACMT 10. At this time, a "Discarded Block Request" control signal is sent from the control network 34 of the cache memory to the control network 62 of the CACMT by way of line 46. After the discarded block had been cleared out of the cache, the CACMT either eliminated the item from its CAM 56 or cleared the "processor identifying bit" depending upon whether more than one processor contained that information in the first instance. It then became necessary to transfer the address of the original request from the hold register 24 of the cache memory to the CACMT search register 58 so that a parallel search of CAM 56 could be made to determine whether the CACMT contained the control word which includes the address of the originally requested block. At this same time, a control signal termed the "CACMT Block Request" is transmitted from the control network 34 of the cache memory 6 by way of conductor 48 to the control network 62 of the CACMT 10.

Thus it can be seen that the control signals on the lines 46 and 48 essentially effect the gating of the address information into the search register 58 to initiate the comparisons which determine whether there is a match on that address in the CAM 56.

Initially, when the processor 2 desired a particular word of data and sent out its request for same, it was either a "read" or a "write" request which appeared on the control line 36 from the processor 2 to the associated cache memory 6. Once it was determined that the information was available in the cache for the requesting processor or in the case of a "miss" that the information had to be acquired elsewhere in the system, when this information was finally available in the cache memory unit for the requesting processor, an "Acknowledge" signal was sent via control line 38 from the cache control 34 back to the processor control 20. This "Acknowledge" signal is the means employed for advising the requesting processor 2 that it can expect the data to be sent from the data register 28 to the data register 16 and also permits the processor 2 to start sequencing the next instruction.

The priority evaluation and switching network 40 is a rather conventional device used in systems where multiple processors, multiple I/O controllers or multiple memories are employed. In the system of the present invention it determines whether processor 2 or processor 4 will get control of the CACMT 10 and eventually of the main memory 12. Circuit 40 is also used to route the request addresses and data from main memory 12 back to the controlling processor and to the cache which had made the request for this information.

OPERATION — WRITE MODE

Now that the manner in which a processor can read information from its associated cache or from main memory when the cache unit does not contain the desired word has been explained, consideration will be given to the manner in which new information generated in a processor can be written into its associated cache and from there, into the main memory unit where it becomes available to other processors in the multi-processor system by way of their associated cache memories. It is to be reemphasized, however, that the system under discussion is block oriented, i.e., data is transferred on a block-by-block basis rather than on an individual word basis. As such, during a "write" operation, it is often necessary to access an entire block when it is only desired to change or write-over a single word in that block.

In the explanation of the operation of the "write" mode, it will be assumed that processor 4 rather than processor 2 desires to enter a new data word into a block. In that same way that in explaining the "read" mode of operation, processor 2 was utilized for exemplary purposes, it is also to be understood that in the "write" mode, while processor 4 has been selected for discussion, processor 2 would function in essentially the same fashion.

Figures 6, 6A:
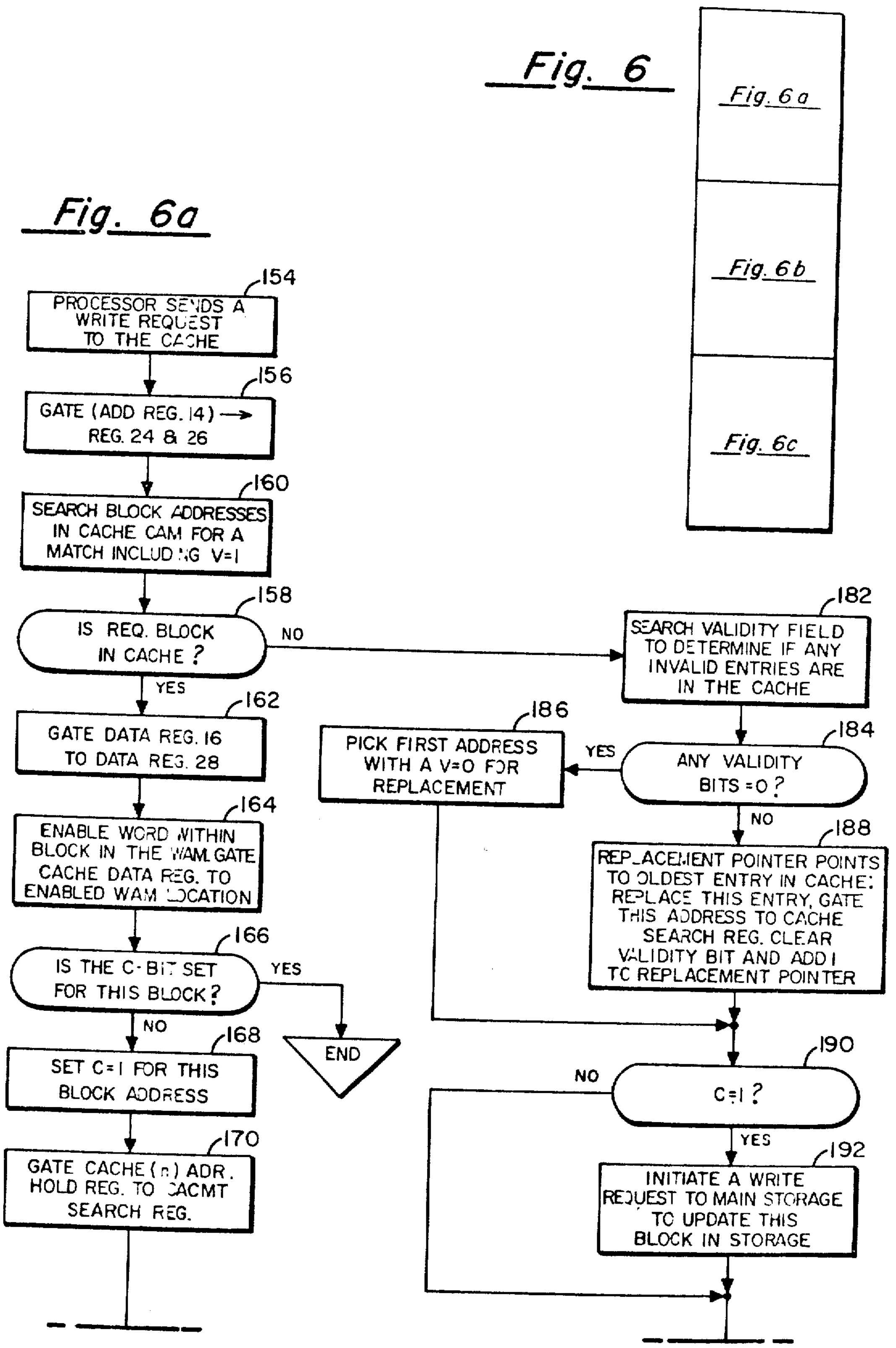
FIGS. 6*a*, 6*b* and 6*c* when positioned as shown in FIG. 6 is a flow diagram showing the sequence of operation of the system of FIG. 1 when one of the processors in the system is performing a "write" operation.

The "write" operation is initiated when processor 4 develops a "Write Request" control signal on line 36, which operation is represented by symbol 154 in FIG. 6a. As indicated by flow chart symbol 156, this control signal causes the address of the block where the new word of data is to be stored to be transferred from the address register 14 of processor 4 to the cache holding register 24, and from there to the associated search register 26. Referring to the flow chart of FIG. 6a, it can be seen by symbol 158 that the first test to be made is to determine whether the requested block is resident in the cache memory 8 associated with processor 4. This determination is effected by conducting a parallel search of the block addresses stored in the cache CAM and detecting whether any of these addresses match the block address which had been presented by processor 4 to search register 26. At the same time, the validity bit (V-bit) for each of the block addresses is compared with the V-bit which is set to a "1" in the search register 26 (see symbol 160 in FIG. 6a). If the block address stored in the cache CAM should compare in all respects with the address criteria loaded into the search register 26, but the validity bit for such block address is a "0" rather than a "1" it means that one or more words stored in the cache memory WAM is no longer valid and must be replaced.

Assuming that the requested block is resident in the cache and its V-bit equals "1," a "hit" signal is delivered from CAM 22 to the control network 34 of cache memory unit 8. This "hit" signal, when interpreted by the control network, causes the data stored in the processor's data register 16 to be transferred over cable 32 to the data register 28 of cache memory unit 8 (see symbol 162 of FIG. 6a). Still under control of the memory read/write circuits contained in control network 34, the new data word is written from the data register 28 into the WAM memory portion of CAM 22 at the proper word location within the selected block, the word and block locations being designated by the address signals maintained in the search register 26 (see symbol 164 of FIG. 6a).

Following the entry of a new data word into a specified block and word location within that block, a check is made to determine whether the "changed" bit (C) of the block address stored in the search register 26 (FIG. 3) had been previously set (see symbol 166). If so, the write operation has been completed. If not, however, it is necessary that this C-bit be set (symbol 168) and also that the C-bit of the status control word for this block stored in the CACMT be set so as to serve as a means of notifying another processor or I/O controller wishing to access the corresponding block in main memory that it no longer contains the most current information and that the particular processor responsible for the change must effect a write of the new information into the main memory so that it will be available to the other requestors in the system. The steps used in updating the C-bit of status control words in the CACMT are depicted by flow chart symbols 170 through 180. As is illustrated, the address of the updated block is transferred via cable 50 and the priority evaluation and switching network 40 from the holding register 24 into the CACMT search register 58. A parallel search of the CACMT CAM 56 is then initiated to determine whether a status control word having the same address tag as the address signals in the register 58 is present in the CAM 56. If not, it is an error condition since by system definition there must be a status control word in the CACMT for each block resident in the cache memory units. Once the desired status control word location is found in the CAM 56, the write strobe and the appropriate word address line and bit line is energized to cause the C-bit of the specified status control word (FIG. 4) to be set (symbol 176).

Next the processor identifying bits $P_0 \ldots P_n$ and the I/O controller identifying bits $I/O_0 \ldots I/O_n$ of this status control word are sensed to determine whether the block in question is resident in the cache memory unit of any other requestor in the system (symbol 178). If such is the case, the control network 62 applies a control signal to the lines 43 connected to the control networks 34 of the cache identified as having this block undergoing modification. This control signal is effective to set the "Invalidate" flip-flop (not shown) contained in the specified cache's control networks. In addition to the "Invalidate Block Request" control signal 43, the cache receives the address of the block being changed from the CACMT search register 58 over cable 52. This block address is gated into the appropriate cache's search register 26. A block search is then initiated and the validity bit (V) is cleared for this entry in the cache memory. The appropriate processor bit ($P_n$) in the corresponding CACMT entry is also cleared at this time. Hence, a subsequent request for this information from Processor (n) will result in a determination that the information is not available in the cache memory of Processor (n) and a main memory read operation will be required to copy the updated information to cache (n).

This completes the explanation of the "write" operation in a multi-processor system having multiple cache memory units when the block to be altered is resident in the cache unit of the active requestor. Consideration will now be given to the additional operational steps resulting when the data block to be altered is not initially resident in the cache unit of the requesting unit. As shown in FIG. 6a, this is the path followed out of the "No" side of decision symbol 158.

Figure 6B:
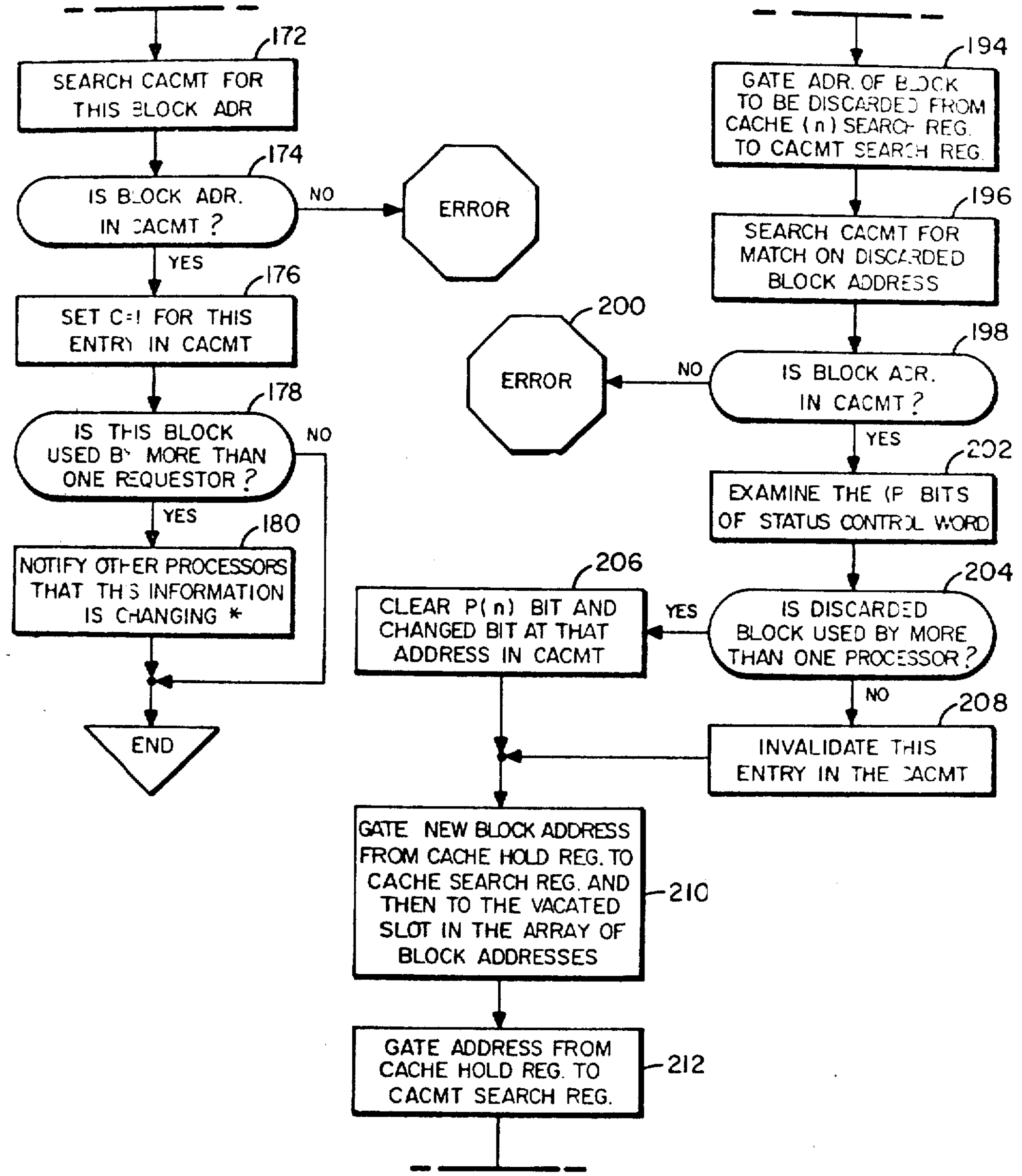

When the flow diagram of FIG. 5 is compared with that of FIG. 6, it will be seen that the operations set out in the symbols identified by even numbers from 182 through 234 in FIG. 6 are identical to those set out in the symbols identified by the even numbers 94 – 146 in FIG. 5. Because these operations and the purposes thereof have already been fully explained in connection with the "read" mode of operation at pages 17 – 29, supra, it is considered unnecessary to repeat the detailed explanation in connection with the present "write" mode of operation. It should suffice to point out here that the operations represented by symbols 182 – 188 in FIG. 6a establish a location in the cache unit where a new block from main memory can be inserted; steps 190 and 192 update the main memory when the block to be discarded is different from its counterpart in main memory; steps 194 through 206 of FIG. 6b update the status control word in the CACMT for the block to be discarded preparatory to the receipt of a replacement status control word for a new block to be acquired from main memory 12; step 210 establishes the block address in the cache CAM where the new information from main memory is to be stored in the cache WAM; steps 212 through 228 enter a new status control word (FIG. 4) in the CACMT for the new block of information to be brought into the cache buffer of the active requestor; and steps 230 through 234 read the new block out from the main memory 12 and via the priority evaluation and switching unit 40 to the data register 28 of the requestor and from there, the new block is written into the area in the cache WAM established to receive it.

Figure 6C:
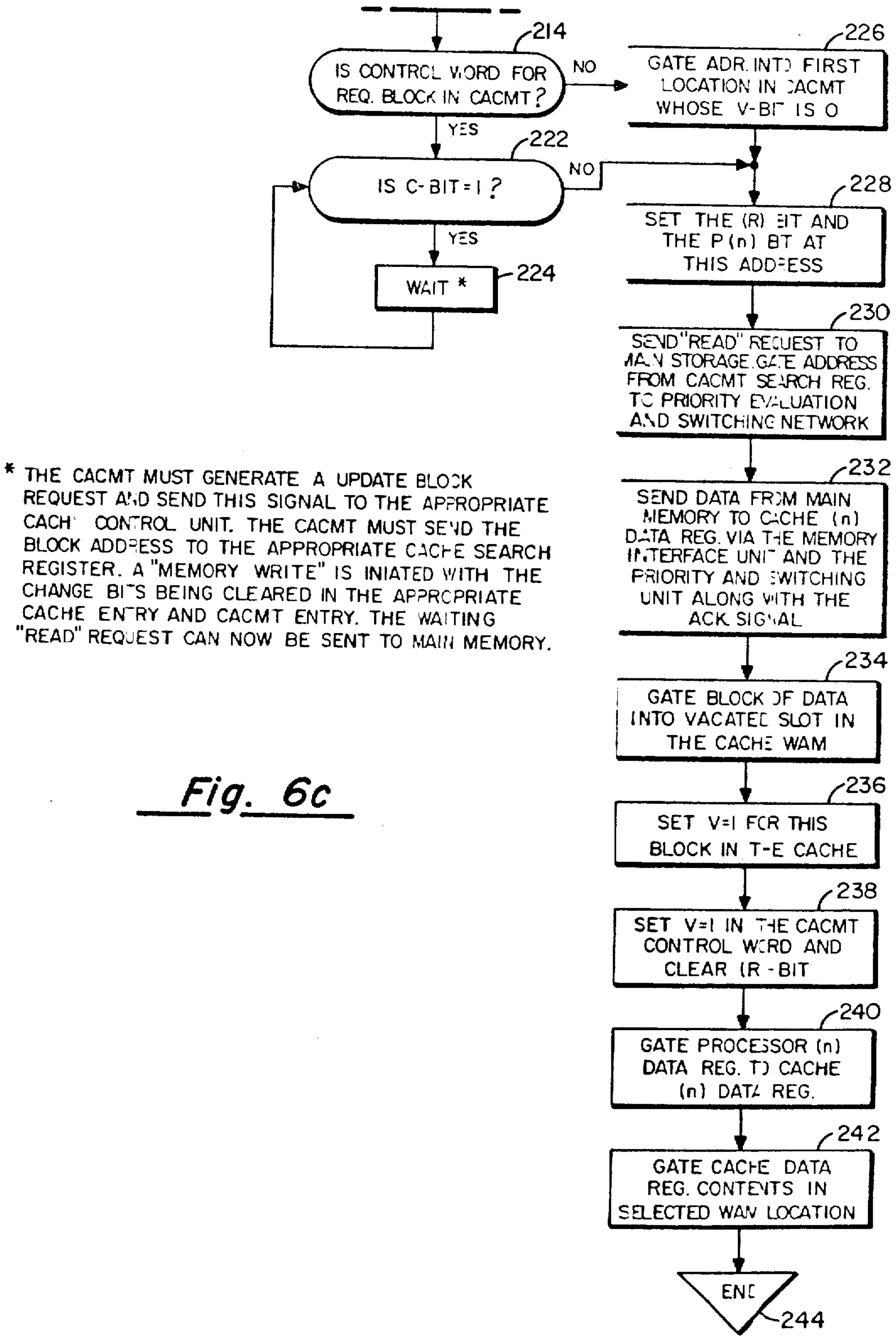

Once the block to be written into is resident in the cache WAM of the requesting processor, the V-bit and the C-bit of the block address in the cache CAM are set to thereby reflect that the block of information in question is valid and that it is about to undergo a change which will make it different from its counterpart in main memory 12. Subsequently, the status control word in the CACMT CAM 56 having the same block address tag as the selected block in the cache memory is updated by the setting of the V-bit and C-bit thereof and the clearing of the R-bit. These last two operations are shown by symbols 236 and 238 in FIG. 6c.

With these "housekeeping" operations out of the way, the contents of the data register 16 of the processor doing the "write" operation are gated into the data register 28 of its associated cache buffer unit so as to be applied to the data terminals $D_0 \ldots D_n$ of the WAM for the specified block. When the write strobe line is pulsed, the contents of the data register 28 will be entered into the WAM word register specified by the address maintained in the search register 26, thus completing the update of the addressed word within the block.

In prior art cache memory arrangements of the type referred to in the introductory portion of this specification, a main memory write cycle is required each time the processor generates a "write" command. In the system of the present invention, the information is updated in the main memory only if it is to be changed, and then only when that block is essentially displaced from the cache memory or if another processor requires access to that same block that has been altered. This offers the distinct advantage that the same word may be changed several times before it is written back into the main memory and the need for additional main memory write cycles as this information is changed many times is obviated.

A given processor in the system of the present invention refers to the CACMT to determine if another processor has a particular block stored in its cache memory unit, and also to determine if the block has been changed. If it had been changed, then the CACMT, in response to this other processor's request, will inform the processor in whose cache memory this block is contained, to write it back into the main memory so that the new requesting processor can acquire the updated version from main memory. No attempt has been made to permit communication between the individual cache memories of the several separate processors in the system. In other words, inquiries are made through the management table (CACMT) and the data is always transferred between processors by way of main memory. While at first blush it may seem desirable to permit direct communication between cache memories, it turns out not to be so because if this were allowed, two or more cache memories would be tied up in order to effect such a transfer. The reason for utilizing a cache memory in the first instance is to speed up the processor/storage interface, thereby increasing the processor throughput. If two or more cache memories are engaged in intercomputer exchanges, they are simultaneously occupied and their associated processors are precluded from processing information while these data transfers are taking place.

Thus it can be seen that there is provided by this invention a new architecture for a multi-processor computer system which permits the several processors to have their own assigned cache memory such that the effective cycle time of the memory hierarchy is reduced substantially from that afforded by a single large capacity main memory. While there has been illustrated and explained a preferred embodiment of the invention, it is to be understood that various changes and modifications may be made thereto without departing from the spirit and scope of the invention as set forth in the following claims.

What is claimed is:

1. In a multi-processor type digital computing system, the combination comprising:

a. a plurality of individual requestor units, each including addressing means for fetching instructions to be executed and executing means for processing data in a sequence of operations in accordance with said instructions;

b. a corresponding plurality of relatively low capacity, high cycle time cache memory units, each unit individually connected to a different one of said requestor units for storing at addressable locations therein a limited number of blocks of information words including operands and instructions to be processed, each said cache memory unit including means responsive to said addressing means for determining whether information sought by its respective requestor unit is available therein;

c. a relatively large capacity low cycle time main memory unit for storing at addressable locations therein a complete complement of blocks of information words usable in the system;

d. a content addressable cache management table connected intermediate said main memory and said plurality of cache memory units for storing a status control word for each block of information words currently stored in said plurality of said cache memory units, said status control words being referenced by a given requestor unit in order to access said main memory when information sought is not available in its associated cache memory unit;

e. means for updating the status control word corresponding to a given block in one of said cache memory units at least the first time in said sequence of operations that a change is made in the information words stored in said given block in said one cache memory unit.

2. Apparatus as in claim 1 wherein each of said cache memory units comprises:

a. a first plurality of storage registers, each adapted to store signals representing an individual block address, and each having a respective output line;

b. a search register adapted to contain an address tag;

c. means for simultaneously comparing the address tag stored in said search register with the contents of said plurality of storage registers and for producing an output signal on the respective output line associated with a storage register storing a block address matching said address tag;

d. a second plurality of storage registers for containing a plurality of blocks of information words at addressable locations therein; and e. means responsive to said output signal and to the contents of said search register for uniquely selecting a given information word from said plurality of blocks of information words.

3. In a multi-processor digital computing system, the combination comprising:

a. a plurality of individual processor units, each including addressing means for fetching instructions to be executed and arithmetic means for processing data in a sequence of operations in accordance with said instructions;

b. a corresponding plurality of relatively small capacity, short cycle time cache memory units, each unit individually connected to a different one of said processor units for storing at addressable locations therein a limited number of blocks of information words including operands and instruction to be processed, each said cache memory unit including means responsive to said addressing means for determining whether information sought by its respective processor is available therein;

c. a relatively large capacity, long cycle time main memory for storing complete sets of programs of instructions and operands at addressable locations therein;

d. management table means connected intermediate said main memory and said plurality of cache memory units for storing a status control word for each block of information words currently stored in said plurality of cache memory units, said status control words being referenced by a given processor in order to access said main memory when information sought is not available in its associated cache memory unit; and e. means for updating the status control word corresponding to a given block in one of said cache memory units at least the first time in said sequence of operations that a change is made in the information words stored in said given block in said one cache memory unit.

4. Apparatus as in claim 3 wherein said management table means comprises:

a. a content addressable memory adapted to store a plurality of status control words, each status control word including an address field and a plurality of identifier bits;

b. means operative upon the determination that information being sought by a given processor is unavailable in the cache memory unit connected to that processor for searching said content addressable memory for a status control word having a given address field; and c. means responsive to the results of a search by said searching means for determining from said identifier bits whether said information being sought is contained in the cache memory unit associated with a processor other than the given processor.

5. Apparatus as in claim 3 and further including:

a. a priority evaluation circuit having a plurality of input ports adapted to receive request control signals from one or more of said cache memory units;

b. switching means connected intermediate said main memory and said plurality of cache memory units; and c. means connecting said priority evaluation circuit to said switching means for establishing a communications path between said main memory and only one of said plurality of cache memory units at any given instant.

6. A computing system as in claim 3 wherein said plurality of cache memory units each comprise:

a. a content addressable memory array for storing a plurality of block addresses;

b. a word addressable memory for storing a plurality of blocks of information words in an array of word registers;

c. search register means connected to receive address representing signals from an associated processor;

d. signaling means connected to said content addressable memory array for indicating whether a block of information words having a predetermined relationship to said address representing signals contained in said search register means is stored in said word addressable memory array;

e. digital logic means connected to said content addressable memory array and said search register means for selecting one of said word registers in said array; and f. data register means connected to said word addressable memory array adapted to temporarily store information words read out from or to be entered into said selected one of said word registers.

7. Apparatus as in claim 6 and further including control means in said management table means responsive to the output from said signaling means and to the contents of said search register means for searching the contents of said management table means for a given status control word when said signaling means indicates that said block of information sought in said content addressable memory means is not present therein.

8. A method of operating a digital computing system of the type including a plurality of independent processor units, each including means for accessing instructions and operands and means for executing said instructions, a corresponding plurality of low cycle time, low capacity cache memories, with one of said memories connected in a communicating relationship with one of said processor units, a relatively high capacity, high cycle time main memory for storing instructions and operands, and a management table for storing status control words corresponding to groups of information words stored in said plurality of cache memories including the steps of:

a. sending a request control signal and an address tag from at least one of said processors to its associated cache memory;

b. searching said associated cache memory to determine whether an item of information having said address tag is resident in said associated cache memory;

c. transmitting said request control signal and said address tag to said management table when the searching of said associated cache memory reveals that said item of information is not resident in said associated cache memory;

d. searching said management table for a status control word corresponding to the group of information words including the word requested by said one of said processors;

e. updating said status control word to indicate a change in the information content in said associated cache memory;

f. forwarding said request signal and said address tag from said management table to said main memory;

g. reading out from said main memory the group of information words specified by said address tag; and h. transmitting said group of information words from said main memory to said associated cache memory for storage therein.

9. The method as in claim 8 and further including the step of:

a. examining the bits of said status control word; and b. signaling the processor sending said request control signal that the item of information being requested is unavailable to the requesting processor when said status control word bits are of a predetermined combination.

10. The method as in claim 8 and further including the steps of:

a. determining whether said associated cache memory has unallocated storage space available in which information from said main memory may be stored;

b. selecting by a predetermined algorithm a group of information words to be discarded from said associated cache memory upon the determination that said associated cache memory contains no unallocated storage space; and c. changing the status control word in said management table assigned to said group of information words to reflect the discarding of said group by said associated cache memory.

11. A method of operating a digital computing system of the type including a plurality of individual processor units each including instruction acquisition and instruction execution means, an equal plurality of cache memory units for storing a predetermined number of blocks of information including instructions and operands, there being one such cache memory unit associated with each of said processor units, a main memory having a high capacity and high cycle time compared to that of said cache memory units, and a content addressable cache management table for storing one status control word for each block of information stored in all of said plurality of cache memory units, said status control words each including an address tag corresponding to block addresses in said cache memory units and said main memory and a plurality of control bits, the steps comprising:

a. generating a request control signal and an address tag in one of said plurality of processors;

b. searching the contents of the cache memory unit associated with said one processor for a block having said address tag;
c. transferring a word of data from said one processor into said block having said address tag;
d. searching said content addressable cache management table for a status control word associated with said block having said address tag;
e. examining said plurality of control bits of the status control word resulting from the preceding step for determining whether said block is stored in the cache memory unit of other than said one of said plurality of processors; and
f. notifying such other processors that the block of information specified by said address tag has been changed.

12. The method as in claim 11 and upon the determination that the block of information specified by said address tag is not resident in the cache memory unit associated with said one processor, further including the steps of:
a. searching said content addressable cache management table for a status control word having the same address tag as that generated by said one processor; and
b. examining said plurality of control bits for determining whether said block of information located in said main memory is available to said one processor.

13. The method as in claim 12 and further including the steps of:
a. examining said plurality of control bits for determining whether said block of information specified by said address tag is resident in the cache memory units associated with other than said one processor; and
b. based upon the outcome of the preceding step, notifying such other processors that said block of information is in the process of being modified.

14. The method as in claim 12 and further including the steps of:
a. transmitting said request control signal and said address tag to said main memory;
b. reading out the block of information specified by said address tag from said main memory;
c. routing said block of information from said main memory to the cache memory unit associated with said one processor which generated said request control signal for storage therein at the address specified by said address tag;
d. modifying said control bits of the status control word associated with said block of information to indicate the presence of said block of information in the cache memory unit associated with said one processor; and thereafter
e. transferring a data word from said one processor to a predetermined address within said block of information now contained in said cache memory unit associated with said one processor.

* * * * *

UNITED STATES PATENT OFFICE
CERTIFICATE OF CORRECTION

Patent No. 3,848,234 Dated November 12, 1974

Inventor(s) Thomas Richard Mac Donald

It is certified that error appears in the above-identified patent and that said Letters Patent are hereby corrected as shown below:

Column 20, line 28, "instruction" should be -- instructions -- .

Column 22, line 25, "step" should be -- steps -- .

Signed and sealed this 11th day of March 1975.

(SEAL)
Attest:

RUTH C. MASON
Attesting Officer

C. MARSHALL DANN
Commissioner of Patents
and Trademarks